United States Patent
Nerem

[15] 3,647,997
[45] Mar. 7, 1972

[54] LOAD TRANSFER SWITCH ASSEMBLY
[72] Inventor: Marvin E. Nerem, 136 East M. Street, Forest City, Iowa 50436
[22] Filed: Nov. 16, 1970
[21] Appl. No.: 89,957

[52] U.S. Cl. .................................................. 200/50 C
[51] Int. Cl. ................................................. H01h 9/24
[58] Field of Search ............... 200/50 C, 5 R, 5 A, 5 B, 5 C, 200/5 D, 5 E, 5 F, 172 A, 172 B; 317/112–120

[56] References Cited

UNITED STATES PATENTS

| | | | |
|---|---|---|---|
| 3,492,448 | 1/1970 | Phillips | 220/50 C |
| 805,057 | 11/1905 | Craft | 200/5 R X |

FOREIGN PATENTS OR APPLICATIONS

| | | | |
|---|---|---|---|
| 787,469 | 12/1957 | Great Britain | 200/42 T |

Primary Examiner—Robert K. Schaefer
Assistant Examiner—M. Ginsburg
Attorney—Burd, Braddock & Bartz

[57] ABSTRACT

An electric circuit load center for recreational vehicles equipped with a load transfer switch assembly operable to connect a utility power supply to a load and separately operable to connect a generator power supply to the load. The load transfer switch assembly has a control member operable in response to movement of separate switch handles to insure that only one power supply is connected to the load at any one time.

9 Claims, 4 Drawing Figures

Patented March 7, 1972

INVENTOR.
MARVIN E. NEREM
BY
Burd, Braddock & Bartz

ATTORNEYS

Patented March 7, 1972

INVENTOR.
MARVIN E. NEREM
BY
Burd, Braddock & Bartz

ATTORNEYS

LOAD TRANSFER SWITCH ASSEMBLY

BACKGROUND OF INVENTION:

Many recreational vehicles as motor homes, truck campers, travel trailers and the like, are equipped with electric generating units to supply electric power to air conditioners, appliances and electric lights. The electrical wiring system of recreational vehicles includes a power connection or socket adapted to be connected to a conventional outside 110-volt power supply or utility power supply. The electrical wiring system also has a load transfer switch operable to disconnect the generator from the circuit when the utility power supply is connected to the vehicle circuit. Manually operated load transfer switches are not designed to automatically disconnect the generator when the utility power supply is connected to the circuit. When both power supplies are connected to the load the result is damage to the generator and the generator controls.

SUMMARY OF INVENTION

The invention relates to a load transfer switch assembly operable to connect a first power source and a second power source selectively and independently to a load. The switch assembly has a control means which allows only one power source at a time to be connected to the load. The switch assembly has a pair of electric switches having operating handles that are selectively movable to "on" and "off" positions. The switches can be electrical circuit breakers. Each switch is adapted to be connected to a separate power source so that when the switch handle is in the "on" position the power source is connected to the load. The control means comprises a movable member engageable with the handles of the switches so that when one handle of one switch is moved to the "on" position the handle of the other switch is moved to the "off" position before the first switch is snapped "on". This insures the connection of only one power source at a time to the load. The control means has a slide member that is movably mounted on a block attached to casings of the switches. The slide member has opposite transverse edges which engage the operating handles of the switches so that the switches must work together.

An object of the invention is to provide a low cost and safe load transfer switch assembly with a control means operable to insure that only one power source at a time is connected to a load. Another object of the invention is to provide a coordinated control structure for conventional circuit breakers that is usable with the circuit breakers without modifying the circuit breaker structure or casing.

Figure 1:
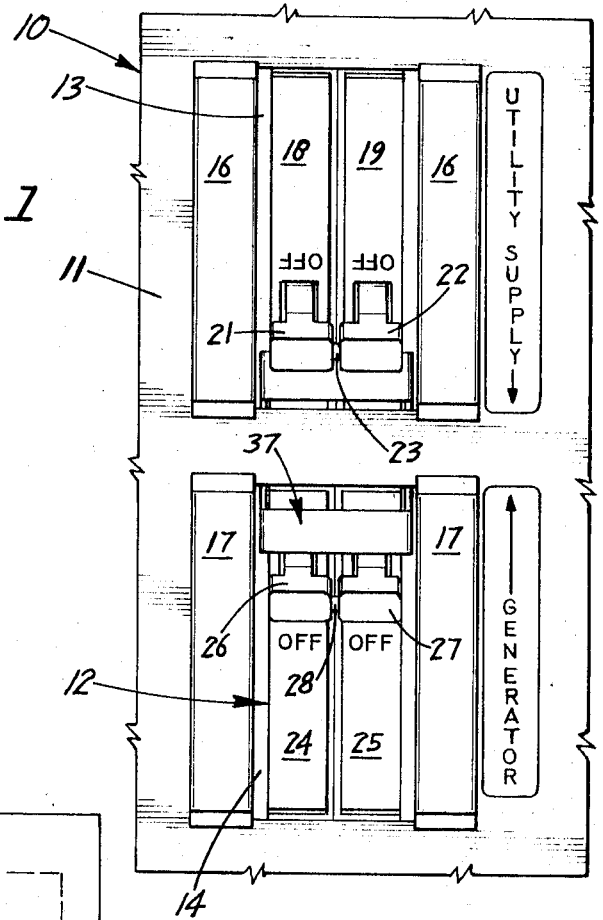
FIG. 1 is a front plan view of a switch panel equipped with the load transfer switch assembly of the invention.

Referring to the drawing there shown in FIG. 1, a fragmentary plan view of the top of a switch box or panel indicated generally at 10. The panel 10 comprises a box housing electrical switches as circuit breakers, of an electrical system, as used in recreational vehicles. The load transfer switch assembly 12 can be used in any electrical system adapted to utilize separate power sources.

The panel 10 has a top cover of 11 extended over a load transfer switch assembly indicated generally at 12. The cover 11 has aligned openings 13 and 14 for accommodating the upper sides of the switch assembly. Removable elongated strips 16 and 17 located on opposite sides of the openings 13 and 14 provide additional spaces to accommodate added switches, as circuit breakers. All of the circuit breakers can be mounted in the panel so that the entire load center for the electrical system is located in the panel 10. Alternatively, the load center can be in a separate switch box connected to the load transfer switch assembly.

Figure 2:
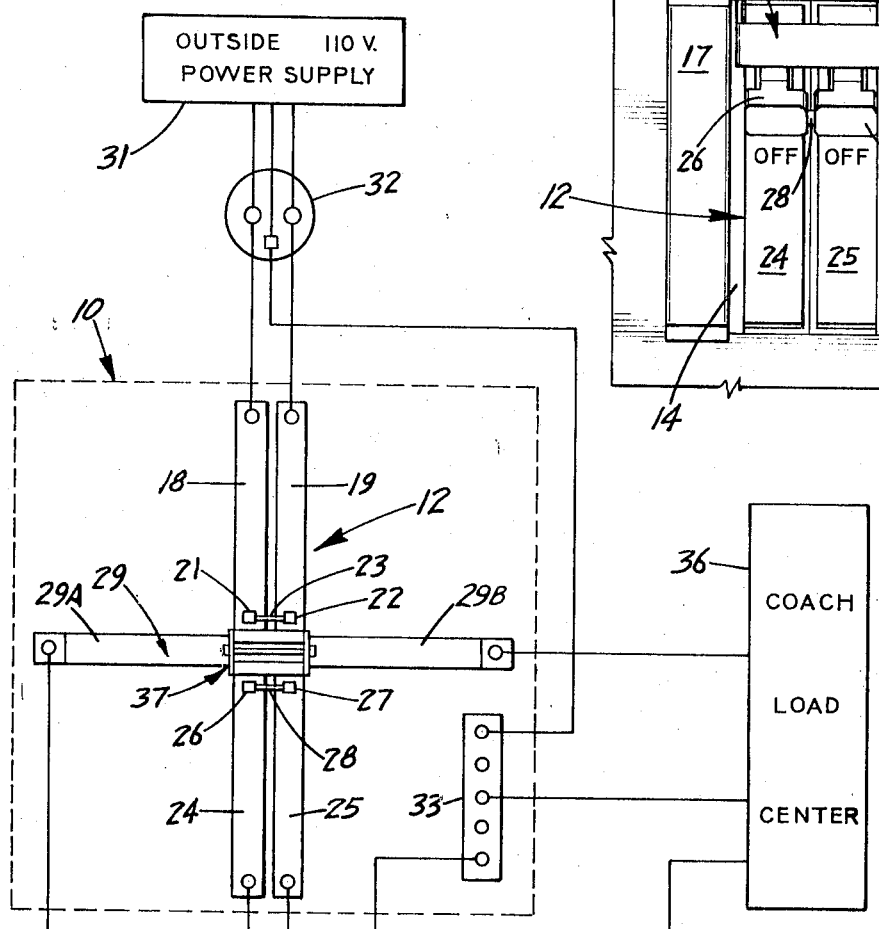
FIG. 2 is a circuit diagram connecting the load transfer switch assembly to an outside power supply, a generator and load center.
Figure 3:
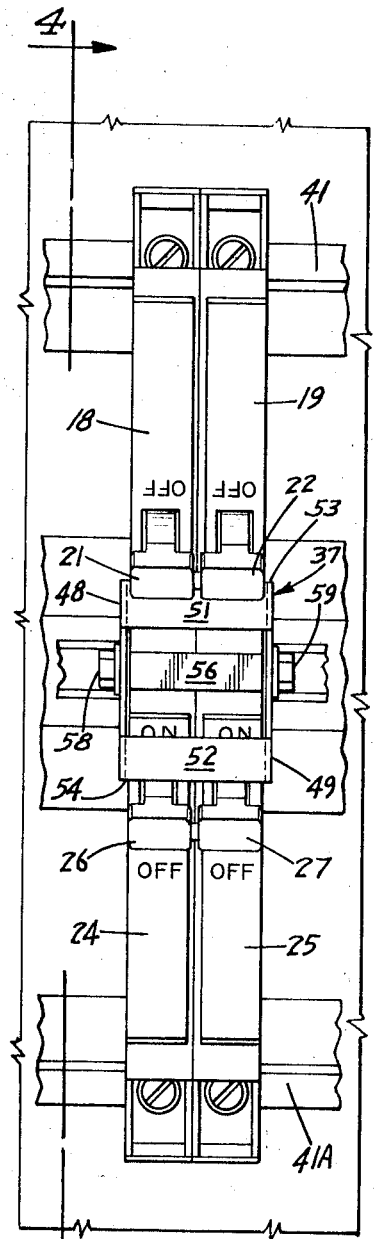
FIG. 3 is a top plan view of the load transfer switch assembly.

Referring to FIG. 2, there is shown a circuit diagram which includes the load transfer switch assembly 12. Switch assembly 12 comprises a first pair of circuit breakers 18 and 19 having operating handles 21 and 22 coupled together with a link 23. Handles 21 and 22 are selectively movable together to "off" and "on" positions. Longitudinally aligned with the first pair of circuit breakers 18 and 19 is a second pair of circuit breakers 24 and 25. Projected upwardly from the one end of the circuit breakers 24 and 25 are operating handles 26 and 27 coupled together with a link 28. Operating handles 26 and 27 are selectively movable to "on" and "off" positions. The circuit breakers 18, 19, 24 and 25 are connected to a common conductor 29 formed of two electrically insulated portions 29A and 29B.

The first pair of circuit breakers 18 and 19 are connected to an outside power supply or utility 110 volt power supply 31 through a socket or polarized plug 32. Plug 32 is also connected to a ground bar 33 located in the switch box 10. Circuit breakers 24 and 25 are connected to the electric generator 34. When the operating handles 26 and 27 are in the "on" position the generator 34 is electrically connected to the conductor 29. The operating handles 21 and 22 are in the "off" position so that only the generator 34 is connected to the conductor 29. The outside power supply remains disconnected from the conductor as long as the switches 24 and 25 are "on". The conductor 29 and ground bar 33 are connected with suitable lines to load 36, as a coach load center. The load center can be located within the panel 10 by the use of additional circuit breakers coupled to the conductor 29 and a suitable bracket mounted on the base of the panel.

Figure 4:
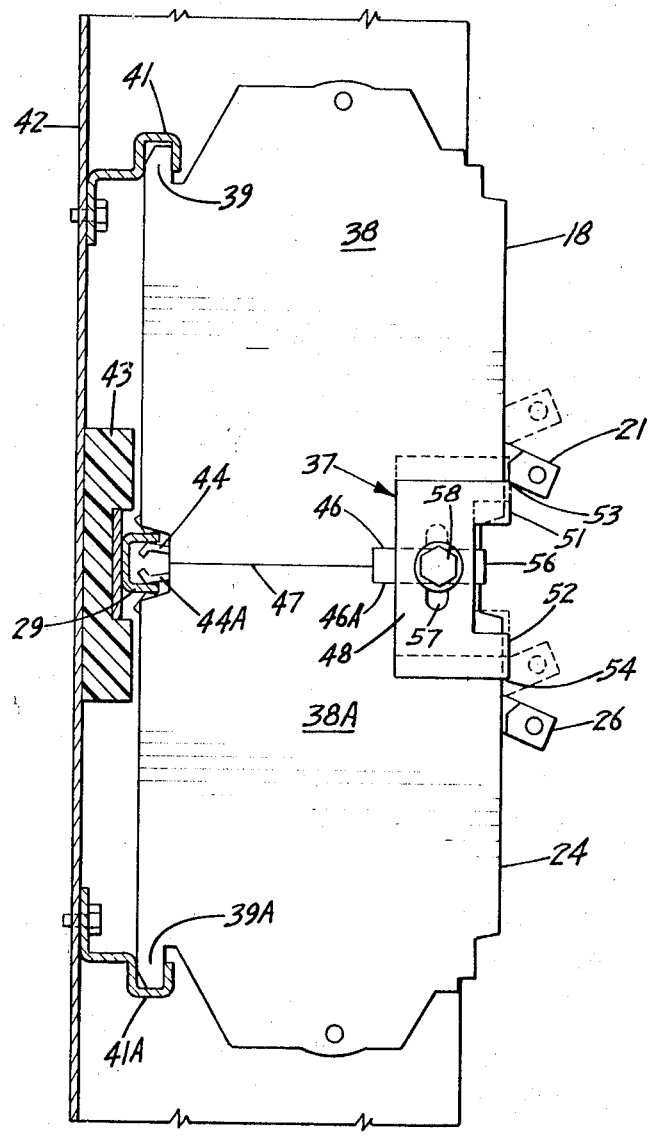
FIG. 4 is a side view of the load transfer switch assembly taken along line 4—4 of FIG. 3.

Referring to FIG. 4, there is shown longitudinally aligned circuit breakers 18 and 24 mounted in assembled relation with the switch control means indicated generally at 37. The circuit breakers are identical in structure and operation. The following description is directed to circuit breaker 18. Corresponding parts of circuit breaker 24 have the same reference numbers with a suffix "A". Examples of suitable circuit breakers are the General Electric type TQP, and the circuit breakers shown in U.S. Pat. Nos. 2,922,004 and 2,953,650. Circuit breaker 18 has an electrically insulative casing or housing 38 having an outwardly directed toe 39 at one end of the bottom of the casing. The toe 39 engages a hook-shaped bracket 41 mounted on the base 42 of the panel 10. An electrical insulative block 43 is secured to the midportion of the base 42. The electrical conductor 29 is mounted on the block 43. The switch 18 has a load terminal 44 that clamps on an upright bridge member of the conductor 29. The top portion of the front face of the casing 38 has an inwardly directed cavity or recess 46.

The front walls of the casings 38 and 38A are located in a face to face engaging relationship thereby longitudinally aligning the operating handles 21 and 26. The circuit breakers 19 and 25 are identical in structure and are mounted in the same manner on the brackets 41 and 41A and the conductor 29. In other words, the first pair of circuit breakers 18, 19 are longitudinally positioned with respect to the second pair of circuit breakers. The operating handles 21 and 22 move in the same general longitudinal direction or plane as the operating handles 26, 27.

The control means 37 for the circuit breakers 18, 19 and 24, 25 has a pair of sidewalls 48 and 49 located adjacent the outside faces of the circuit breaker casings. The sidewalls 48 and 49 are connected with top transverse walls 51 and 52 thereby form a one piece generally U-shaped unit that fits over the circuit breaker casings between the operating handles 21, 22 and 26, 27. The top wall 51 has an outside transverse edge 53 that is engageable with the operating handles 21 and 22. The top wall 52 has the outside transverse edge 54 that is engageable with operating handles 26 and 27. The longitudinal distance between the transverse edges 53 and 54 is such that the operating handles 21 and 22, 26 and 27 can not both be in their "on" positions at the same time. This distance is such that when the handles 21 and 22 are moved from the "off" position to the "on" position, the handles 26 and 27, if they are in their "on" position, are moved to the "off" position before the circuit breakers 18 and 19 are snapped "on". The walls 51 and 52 are longitudinally separated from each other to provide space for the portion of the top cover between the operating handles 21, 22 and 26, 27.

The sidewalls 48 and 49 are slideably mounted on a transverse block 56 located in the inwardly directed recesses 46 and 46A of the switch casings 38 and 38A. The block 56 made of electrically insulated material is secured with adhesive or similar material to the casings 38 and 38A. This prevents the control member 37 from separating from the circuit breakers. The midportions of the sidewalls 48 and 49 have longitudinal slots 57 accommodating fasteners 58 and 59, as screws or bolts which function to slideably guide the sidewalls for longitudinal movement on the block 56 and mount the movable portion of the control means on the block.

In use, the control means 37 functions to interrelate the "on" and "off" functions of the aligned switches 18, 19 and 24, 25. The first pair of circuit breakers 18 and 19 connected to the outside power supply are operative to connect this power supply to the load 36. When this is done the operating handles 21 and 22 are in their "on" positions. The control member 37 forces the operating handles 26 and 27 to their "off" positions thereby disconnecting the generator 34 from the electrical system. The longitudinal distance between the transverse edges 53 and 54 of the control member 37 is such that the circuit breakers 24 and 25 are disconnected from the circuit before the circuit breakers 18 and 19 are tripped "on". The operating handles 26 and 27 are moved by the control member 37 past their overcenter positions toward their "off" position before the operating handles 21 and 22 move past the overcenter positions toward their "on" positions. The same conditions occur on opposite movements of the handles 21, 22 and 26, 27. This eliminates an electrical connection between the outside power supply and the generator as only one power supply at one time is connected to the load.

When the generator 34 is connected to the load 36 the control means 37 is operative to disconnect the outside power supply by tripping the circuit breakers 18 and 19. This is accomplished by moving the first set of operating handles 21 and 22 to the "off" position before the second set of operating handles 26 and 27 are tripped to the "on" position. As shown in the broken lines in FIG. 4, the entire U shaped clip comprising the sidewalls 48 and 49 and top walls 51 and 52 slide relative to the switch casings, fasteners and guide 58 and 59 to control the switching actions of the operating handles 21, 22 and 26, 27. Both sets of handles 21, 22 and 26, 27 can be located in their "off" positions thereby disconnecting both power sources from the load 36.

The embodiments of the invention in which an exclusive property or privilege is claimed are defined as follows:

1. A load transfer switch assembly operable to connect a first power source and a second power source selectively and independently to a load comprising: a first switch means having a first operating member selectively movable to "on" and "off" positions, said first switch means adapted to be connected to the first power source and the load whereby when the first member is in the "on" position, the first power source is connected to the load, a second switch means generally longitudinally aligned with said first switch means and having a second operating member selectively movable to "on" and "off" positions, said second switch means adapted to be connected to the second power source and the load whereby when the second member is in the "on" position, the second power source is connected to the load, and longitudinally movable control means comprised of a generally U-shaped unit, having a pair of sidewalls connected with first and second top transverse walls, said top transverse walls having respective first and second transverse edges engageable with the first member and the second member, respectively, and operable to move the second member to its "off" position when the first member is moved to its "on" position and to move the first member to the "off" position when the second member is moved to its "on" position, whereby only one power source at a time is connected to the load.

2. The switch assembly of claim 1 wherein: the first switch means and the second switch means are circuit breakers having operating handles, said control means located between the operating handles of the circuit breakers to control the relative positions of the operating handles.

3. The switch assembly of claim 2 including: means mounting the U-shaped unit for general longitudinal movement between the operating handles.

4. The switch assembly of claim 3 wherein: the mounting means comprises a block mounted on the circuit breakers and guide means movably connecting the U-shaped unit with the block.

5. The switch assembly of claim 1 wherein: the first switch means and the second switch means each have an elongated casing, said U-shaped unit slideably positioned on the elongated casings of the switch means between the operating members of the switch means.

6. The switch assembly of claim 5 including: means secured to at least one casing for guiding the movement of the U-shaped unit.

7. The switch assembly of claim 1 wherein: the first switch means and the second switch means are longitudinally aligned circuit breakers having operating handles, said control means located between the operating handles and slideably mounted on the circuit breakers.

8. The switch assembly of claim 1 wherein: the first switch means comprise a first pair of circuit breakers having operating handles linked together, and the second switch means comprise a second pair of circuit breakers having operating handles linked together, said first pair of circuit breakers being located in longitudinal alignment with the second pair of circuit breakers, said control means having a movable member engageable with at least one operating handle on each pair of circuit breakers.

9. The switch assembly of claim 8 including: block means mounted on the circuit breakers and guide means mounting the movable means on the block means.

* * * * *